United States Patent
Siebeck

(10) Patent No.: US 12,017,607 B2
(45) Date of Patent: Jun. 25, 2024

(54) INERTIA SENSOR AND METHOD FOR REDUCING THE FRICTION BETWEEN TWO COMPONENTS OF AN INERTIA SENSOR

(71) Applicant: ZF AUTOMOTIVE GERMANY GMBH, Alfdorf (DE)

(72) Inventor: Boris Siebeck, Schwäbisch Gmünd (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 435 days.

(21) Appl. No.: 17/298,796

(22) PCT Filed: Nov. 29, 2019

(86) PCT No.: PCT/EP2019/083037
§ 371 (c)(1),
(2) Date: Jun. 1, 2021

(87) PCT Pub. No.: WO2020/114897
PCT Pub. Date: Jun. 11, 2020

(65) Prior Publication Data
US 2022/0032871 A1 Feb. 3, 2022

(30) Foreign Application Priority Data
Dec. 5, 2018 (DE) .................... 10 2018 130 923.6

(51) Int. Cl.
*B60R 22/40* (2006.01)
*G01P 1/02* (2006.01)
*G01P 15/02* (2013.01)

(52) U.S. Cl.
CPC .............. *B60R 22/40* (2013.01); *G01P 1/023* (2013.01); *G01P 15/02* (2013.01)

(58) Field of Classification Search
CPC ......... B60R 22/36; B60R 22/40; G01P 1/023; G01P 15/02
See application file for complete search history.

(56) References Cited

U.S. PATENT DOCUMENTS 2,774,062 A 12/1956 Lin
4,328,934 A * 5/1982 Ahad ..................... B60R 22/40
242/384.4

FOREIGN PATENT DOCUMENTS

| DE | 10114889 A1 | 10/2002 |
|---|---|---|
| DE | 102011103113 A1 | 11/2012 |
| DE | 102016122326 A1 | 5/2018 |
| JP | H08216832 A | 8/1996 |
| JP | H1148910 A | 2/1999 |
| JP | 2016030451 A | 3/2016 |
| WO | 1982/00957 A1 | 4/1982 |
| WO | 2015/133131 A1 | 9/2015 |

* cited by examiner

*Primary Examiner* — Sang K Kim
(74) *Attorney, Agent, or Firm* — TAROLLI, SUNDHEIM, COVELL & TUMMINO L.L.P.

(57) ABSTRACT

An inertia sensor (10), in particular provided on a belt retractor (12), includes at least two components which are reversibly movable relative to each other and each of which includes at least one contact surface (20, 22, 34, 36) on which the components are in contact with each other, wherein at least one of the contact surfaces (20, 22, 34, 36) is coated with graphite powder (38).

10 Claims, 3 Drawing Sheets

INERTIA SENSOR AND METHOD FOR REDUCING THE FRICTION BETWEEN TWO COMPONENTS OF AN INERTIA SENSOR

The present invention is a U.S. National Stage under 35 USC 371 patent application, claiming priority to Serial No. PCT/EP2019/08037, filed on 29 Nov. 2019; which claims priority from 10 2018 130 923.6, filed 5 Dec. 2018, the entirety of both of which are incorporated herein by reference.

BACKGROUND OF THE INVENTION

The invention relates to an inertia sensor provided at a belt retractor as well as to a method for reducing the friction between two components of an inertia sensor.

For triggering vehicle-sensitive blocking of a belt retractor in the event of major vehicle decelerations, inertia sensors are known comprising an inertia element which, based on its mass inertia, acts upon a sensor element which in turn actuates a ratchet of the belt retractor. A steel ball supported in a holder provided at the belt retractor is used, for example, as an inertia element. Alternatively, also inertia elements in the form of slightly tiltably supported solid bodies are known. Usually, those inertia elements have dimensions of several millimeters.

SUMMARY

It is the object of the invention to improve the responsiveness of an inertia sensor in a simple and low-cost manner.

This object is achieved by an inertia sensor comprising the features of claim 1. The inertia sensor comprises at least two components which are reversibly movable relative to each other and each of which includes at least one contact surface on which the components are in contact with each other, at least one of the contact surfaces being coated with graphite powder. The inertia sensor is provided on a belt retractor and may form part of the belt retractor.

It has turned out that already a thin layer of graphite powder can significantly reduce the friction between the contact surfaces and, thus, can definitely improve the activation of the inertia sensor. The graphite layer reduces the friction of the contact surfaces movable against each other and therefore also simultaneously the dispersion of the activation values caused by friction forces which is caused by manufacturing differences in surface and material. Therefore, embedding of friction-reducing substances into the material of the components can be dispensed with. It is also advantageous that the graphite powder does not impair a mechanical strength of the material.

Another advantage of the coating of the contact surface with the graphite powder, when applied to delicate, light-weight or inertia-bound components, resides in the fact that activation and transmission forces between the components, especially components of the inertia sensor, are minimal. In contrast to that, externally applied substances such as fats or oils in those applications frequently cannot help achieve the same reduction of friction without disturbing adhesive effects between the contacting components being produced by the lubricants, which effects may result in increased breakaway forces, for example. Those adhesive effects between the contact surfaces of the components contacting each other which are caused by lubricants such as fats or oils can be suppressed or at least strongly reduced by the coating with graphite powder. Thus, the graphite coating of the at least one contact surface can help achieve, in the case of translational movements of the contact surfaces of the components relative to each other, the breakaway forces relevant to the activation of an inertia sensor to be reduced. In this way, a dispersion of the activation values of the inertia sensor caused by adhesive effects can be reduced.

Moreover, graphite is nontoxic even in small grain sizes and is available at low cost, and the impact on the mass inertia of the components is negligible due to the very small mass of the coating even with a very delicate and light-weight design of the components.

Preferably, at least the contact surface of one or both components is made from plastic. Especially preferred, at least one of the components is completely made from plastic. For example, polyoxymethylene (POM) has proven to be a suitable material. The use of a graphite powder in this case offers the additional advantage that graphite excellently adheres to surfaces made from such plastic material.

The friction can be especially strongly reduced by reducing the transfer of the frictional forces during transition from adhesion to slide friction. Accordingly, it is of advantage to dispose the components so that the contact surfaces are shifted against each other.

Good results are obtained, for example, by a graphite powder having an average grain size of the graphite particles ranging from 2 µm to 15 µm, especially preferred of 5 µm.

The layer thickness of the graphite coating can be selected to be very small and can range from about 2 µm to 200 µm, for example.

In general, the inertia sensor is reversible and is designed for multiple use.

In a preferred embodiment, the inertia sensor comprises an inertia element, a deflection element in direct contact with the inertia element and a sensor element in direct contact with the deflection element, the deflection element having a contact surface on each of opposite outer faces, and both contact surfaces being coated with graphite powder. The two outer faces of the deflection element are in direct contact with the inertia element and with the sensor element.

In this case, especially the inertia element shifts relative to the deflection element, thereby in turn the deflection element being shifted relative to the sensor element and thus the latter moving from its home position to a deflected position. When the acceleration of the vehicle ends, the inertia element returns to its home position again and, correspondingly, the deflection element and the sensor element equally move relative to each other into their respective home position.

Hence, the deflection element experiences, in each situation of acceleration in which the inertia sensor responds, a shift movement both relative to the inertia element and relative to the sensor element. Thus, a coating with graphite powder on the two contact surfaces contacting the inertia element and the sensor element is particularly advantageous.

Said three components (inertia element, deflection element and sensor element) preferably form the single movable components of the inertia sensor.

The inertia element is a metal ball, for example, which is supported to be freely rotatable within a stationary holder.

The deflection element in this case preferably includes a shell-type portion, wherein one contact surface is provided on a concave side of the shell-type portion facing the inertia element and one contact surface is provided on a convex side of the shell-type portion facing the sensor element.

In a method for reducing the friction between at least two components of an inertia sensor according to the invention, as it has been described above, in which the components include contact surfaces reversibly movable relative to each other, a coating of graphite powder is applied to at least one of the contact surfaces.

It is possible to completely coat at least one or exactly one of the components with graphite powder.

It is especially advantageous to coat only exactly one of the components of the inertia sensor with graphite powder, when the components comprise, as afore-described, an inertia element, a deflection element in direct contact with the inertia element and a sensor element in direct contact with the deflection element. In this case, preferably only the deflection element having a contact surface on each of opposite outer faces is coated with graphite powder. For this purpose, it is favorable for reasons of time when the entire deflection element is coated with graphite powder in one single working cycle.

The layer of graphite powder is reasonably applied before the inertia sensor is assembled.

The graphite powder can be applied, for example, by being sprayed onto the contact surface.

It is also possible to completely immerse the respective component into graphite powder and to remove the excess powder. For this purpose, it may be sufficient to shake off the excess graphite powder.

Apart from reducing the friction between two abutting components, the graphite powder also offers the advantage that the electrostatic charge between the components is reduced by permanent charge exchange via the graphite layer.

BRIEF DESCRIPTION OF THE DRAWINGS

Hereinafter, the invention shall be described in detail by way of an embodiment with reference to the attached drawings, wherein.

DETAILED DESCRIPTION

Figure 1:
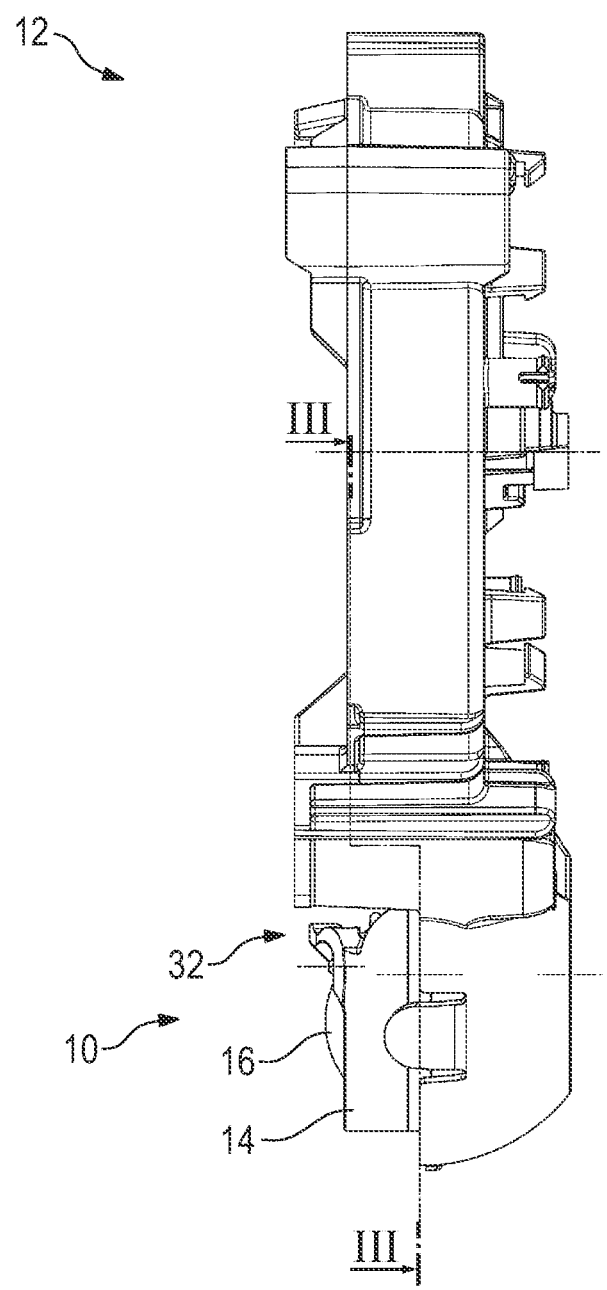
FIG. 1 shows a schematic side view of a cutout of a belt retractor comprising an inertia sensor according to the invention.
Figure 2:
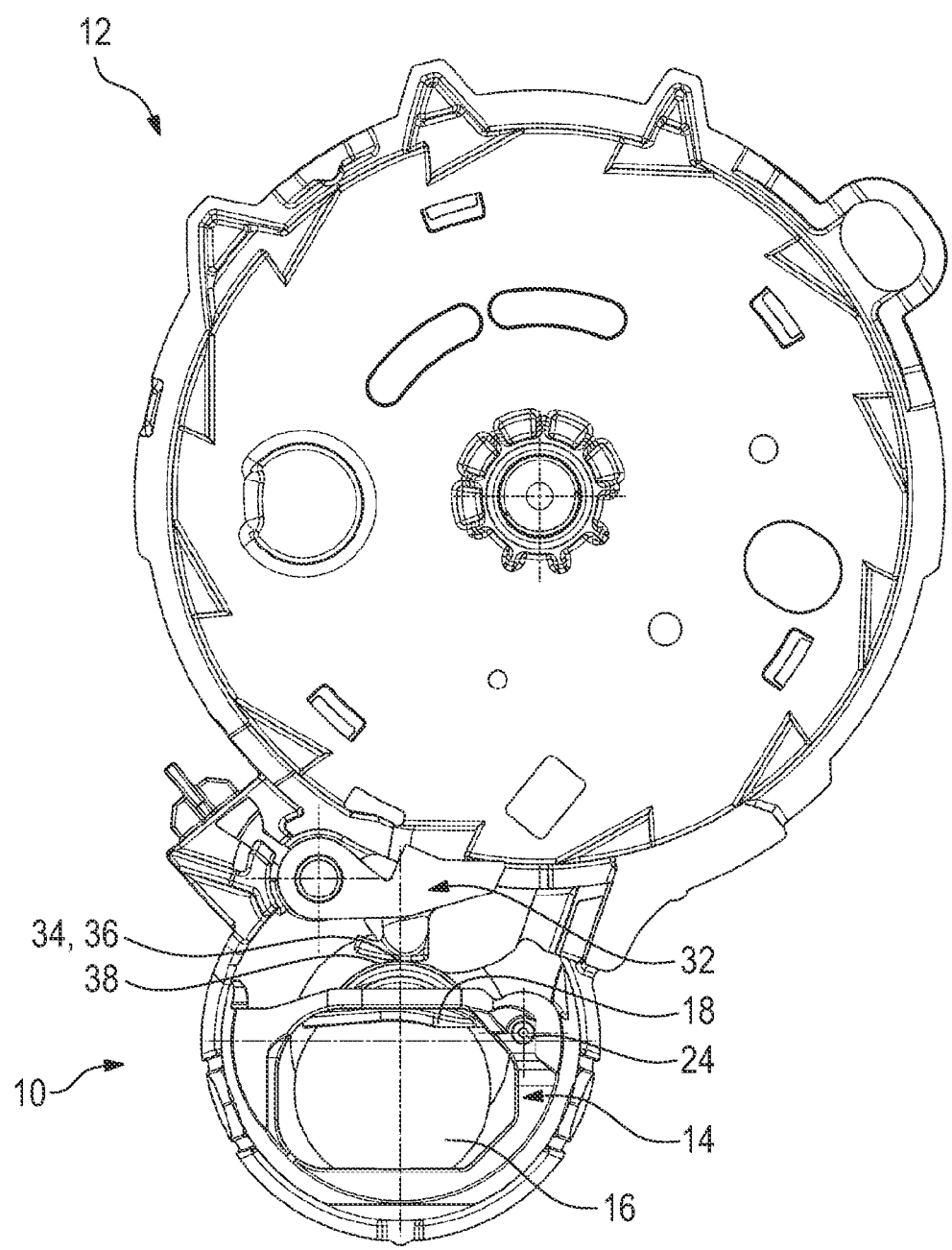
FIG. 2 shows a top view onto the end face of the belt retractor from FIG. 1.

The Figures illustrate an inertia sensor 10 which in this example is part of a belt retractor 12 shown in portion only.

The Figures illustrate the belt retractor 12 in the final vehicle-mounted alignment. The inertia sensor 10 in the shown embodiment is arranged, in the installed state, at a lower end of the belt retractor 12.

A sensor housing 14 is usually integrally connected to a housing of the belt retractor 12.

The inertia sensor 10 in this example includes three components movable relative to each other. In the sensor housing 14, an inertia element 16, here in the form of a metal ball, is accommodated as a first component so that it can move freely within the sensor housing 14. In the normal case, the ball rolls off an inner face of the sensor housing 14.

On the side of the inertia element 16 opposite to the contact area of the inertia element 16 with the sensor housing 14, a deflection element 18 is disposed as a second component such that contact surfaces 20, 22 constantly contact each other at the inertia element 16 and at the deflection element 18.

The deflection element 18 is movably connected to the sensor housing 14. In this example, on one side of the deflection element 18 a pivot axis 24 is provided which is firmly supported within the sensor housing 14 and about which the deflection element 18 can pivot.

The deflection element 18 in this case includes a shell-type portion 26 (see FIG. 3) whose concave side 28 faces the inertia element 16 and forms the contact surface 22, whereas the opposite convex side 30 thereof faces away from the inertia element 16.

Above the deflection element 18, a sensor element 32 including a contact surface 34 which constantly abuts on a contact surface 36 on the convex side 30 of the deflection element 18 is arranged as a third component. The sensor element 32 is fixed to be deflectable on the sensor housing 14, for example.

Figure 3:
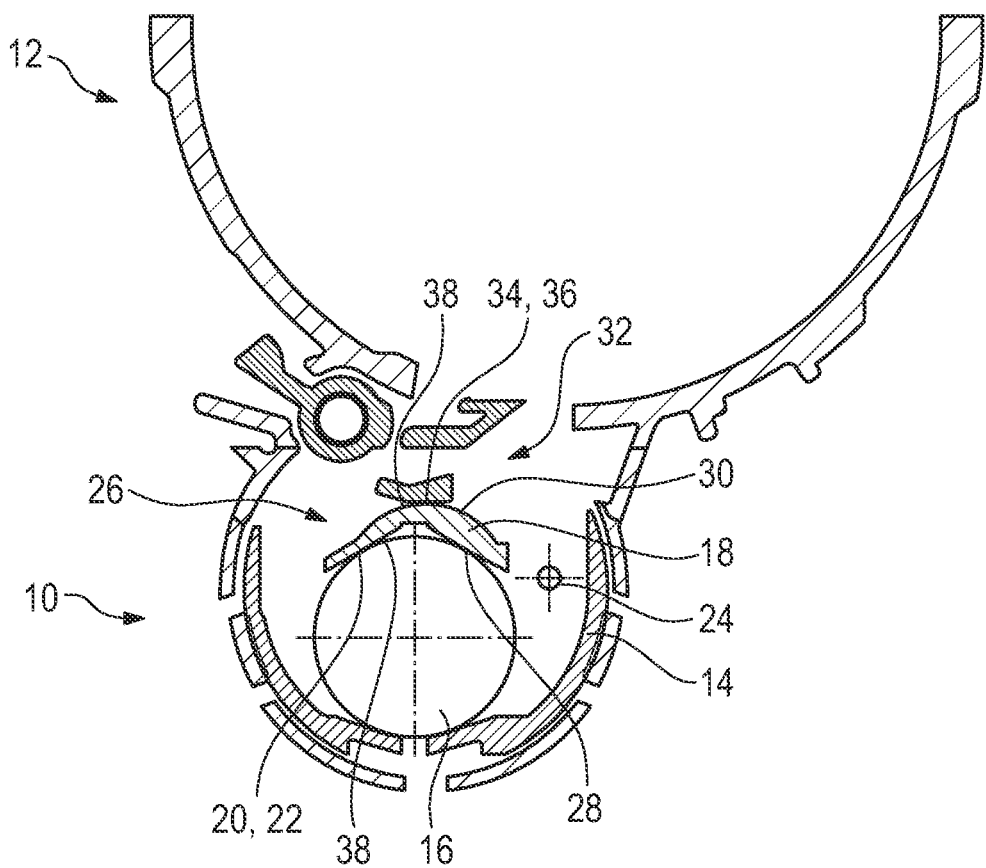
FIG. 3 shows a schematic sectional view of the inertia sensor according to the invention along a line III-III in FIG. 1.

When the vehicle in which the belt retractor 12 is mounted experiences positive or negative acceleration, the inertia element 16 is moved relative to the sensor housing 14 out of its home position shown in FIG. 3. In so doing, the ball of the inertia element 16 in this case rolls off the inner face of the sensor housing 14. Accordingly, the inertia element 16 moves also relative to the deflection element 18, with the two contact surfaces 20, 22 being shifted against each other, hence the deflection element 18 slides along the surface of the inertia element 16. This movement of the inertia element 16 relative to the deflection element 18 causes the deflection element 18 to be pivoted about the pivot axis 24, and, in so doing, to deflect the sensor element 32 from the home position thereof (see FIG. 3) into a deflected position (not shown). The two contact surfaces 34, 36 of the deflection element 18 and the sensor element 32 are shifted against each other and slide along each other. The movement of the sensor element 32 ensures a ratchet which blocks a belt reel of the belt retractor 12 (not shown) to be pivoted.

Whereas the inertia element 16 frequently is made from metal, both of the deflection element 18 and the sensor element 32 are usually plastic parts. A suitable plastic material is POM (polyoxymethylene), for example.

In the embodiment shown here, the deflection element 18 is completely coated with a graphite powder 38. In this case, for example a graphite powder 38 having an average grain size ranging from 2 μm to 15 μm is used.

For this purpose, prior to assembling the inertia sensor 10, the entire deflection element 18 is immersed, for example, into graphite powder 38 or is sprayed with graphite powder 38. The graphite powder 38 then adheres to the contact surfaces without any further aids.

Consequently, a thin permanent layer of graphite powder 38 is formed along the contact surfaces 20, 22 of the deflection element 18 and the inertia element 16 as well as along the contact surfaces 34, 36 of the deflection element 18 and the sensor element 32. The layer thickness may range from about 2 μm and 200 μm, for example. Due to the small layer thickness, the layer is not explicitly illustrated in the Figures.

The graphite coating reduces the friction on the contact surfaces 20, 22 and 34, 36. Moreover, it ensures permanent charge exchange between the inertia element 16, the deflection element 18 and the sensor element 32.

The invention claimed is:

1. An inertia sensor provided on a belt retractor, comprising at least two components which are reversibly movable relative to each other and each of which includes at least one contact surface on which the components are in contact with each other, wherein at least one of the contact surfaces is coated with graphite powder.

2. The inertia sensor according to claim 1, wherein at least the contact surface of one of the components is made from plastic.

3. The inertia sensor according to claim 1, wherein the components are arranged so that the contact surfaces are shifted against each other.

4. The inertia sensor according to claim 1, wherein an average grain size of the graphite particles of the graphite powder ranges from 2 μm and 15 μm.

5. The inertia sensor according to claim 1, wherein an inertia element, a deflection element in direct contact with the inertia element and a sensor element in direct contact with the deflection element are provided, the deflection element including a contact surface on each of opposite outer faces and both contact surfaces being coated with graphite powder.

6. The inertia sensor according to claim 5, wherein the deflection element has a shell-type portion, wherein at least one of the contact surfaces is provided on a concave side of the shell-type portion facing the inertia element, and another of the contact surfaces is provided on a convex side of the shell-type portion facing the sensor element.

7. A method for reducing the friction between at least two components of an inertia sensor according to claim 1, the components including contact surfaces reversibly movable relative to each other, wherein a coating of graphite powder is applied to at least one of the contact surfaces.

8. The method according to claim 7, wherein at least one of the components is completely coated with graphite powder.

9. The method according to claim 7, wherein the components comprise an inertia element, a deflection element in direct contact with the inertia element and a sensor element in direct contact with the deflection element, the deflection element including a contact surface on each of opposite outer faces, and only the deflection element being coated with graphite powder.

10. The method according to claim 7, wherein the graphite powder reduces the electrostatic charge between the components.

* * * * *